United States Patent [19]

Matsui et al.

[11] 4,361,927
[45] Dec. 7, 1982

[54] DEVICE FOR PREVENTING VIBRATION OF WINDSHIELD WIPER

[75] Inventors: Kazuma Matsui, 91, Togocho, Toyohashi-shi, Aichi-ken, Japan; Takashi Kurahashi; Masahiko Suzuki, both of Aichi; Kiyoshi Kawaguchi, Kariya, all of Japan

[73] Assignee: Kazuma Matsui, Toyohashi, Japan

[21] Appl. No.: 266,044

[22] Filed: May 21, 1981

[30] Foreign Application Priority Data

Jul. 2, 1980 [JP] Japan ................................. 55-90319

[51] Int. Cl.³ ............................................... B60S 1/04
[52] U.S. Cl. ................................ 15/250.42; 15/250 R; 188/378
[58] Field of Search ............. 15/250 R, 250.03, 250.2, 15/250.23, 250.3, 250.33, 250.35, 250.36, 250.37, 250.42; 188/378, 381

[56] References Cited

U.S. PATENT DOCUMENTS

| 2,715,951 | 8/1955 | Lieber | 188/378 |
| 2,794,203 | 6/1957 | Oishei | 15/250.36 |
| 2,979,750 | 4/1961 | Anderson | 15/250 |

Primary Examiner—Peter Feldman
Attorney, Agent, or Firm—Cushman, Darby & Cushman

[57] ABSTRACT

A device for preventing the vibration of a windshield wiper including a weight having two ends each secured to one of opposite ends of a pin extending through the end of a holder and separated from each other a suitable distance for the holder and the weight to move relative to each other between the two ends of the pin. The device is mounted on an auxiliary support member of a wiper blade for avoiding the wiper blade being separated from the surface of the windshield by the pressure of air when the vehicle travels at high speed.

11 Claims, 9 Drawing Figures

DEVICE FOR PREVENTING VIBRATION OF WINDSHIELD WIPER

BACKGROUND OF THE INVENTION

This invention relates to the construction of a windshield wiper for a vehicle, for example, and more particularly it is concerned with a device for avoiding vibration of a wiper blade attached to the forward end of a wiper arm caused by frictional dragging on the windshield.

In recent years there has been a marked increase in the speed at which vehicles, particularly automotive vehicles, travel. One of the problems that have been raised by the increased vehicle speed is that the blade of the windshield wiper is separated from the windshield by the pressure of the air during high speed travel of the vehicle. To solve this problem, proposals have been made to increase the force with which the windshield wiper blade is forced against the windshield. A resilient member formed as of rubber is usually attached to the wiper blade and maintained in contact with the windshield for cleaning same. With an increase in the force with which the wiper blade is forced against the windshield, stick slip would occur when the wiper blade moves in sliding movement on the windshield because the coefficient of friction between the resilient member and the surface of the windshield may vary depending on the difference between the relative speeds thereof. This phenomenon would tend to occur when the surface of the windshield is wet. This phenomenon which is caused by the difference in rigidity between the wiper arm, wiper blade and the wiper driving link and the manner in which they are fastened together would cause the wiper blade to vibrate at a frequency of 5–20 Hertz. This vibration is generally referred to as a chattering vibration and causes unpleasant sounds to be produced or water drops to be left unwiped on the windshield.

It would be possible to avoid this phenomenon by increasing the rigidity of various parts to a satisfactory level and fastening them together to avoid their wobbling. However, when such factors as an increase in the size of various components tending to interfere with the visibility of the driver, an increase in the load of the wiper motor and an increase in cost are taken into consideration, the aforesaid means for avoiding the fretting of the windshield wiper would not be considered particularly advantageous.

SUMMARY OF THE INVENTION

This invention has been developed for the purpose of obviating the aforesaid disadvantage. Accordingly the invention has as its object the provision of a device for preventing the vibration of a windshield wiper blade.

The outstanding characteristic of the invention is that there is provided, in a windshield wiper comprising a wiper blade including a resilient member formed as of rubber for wiping the surface of a windshield connected to the forward end of a wiper arm driven by a wiper motor and moved in swinging movement through a linkage, weight means mounted at one end of a holder and comprising a weight having two ends each secured to one of opposite ends of a pin extending through the holder and separated from each other a suitable distance for the holder and the weight to move relative to each other between the two ends of the pin.

DESCRIPTION OF THE PREFERRED EMBODIMENTS

Figure 1:
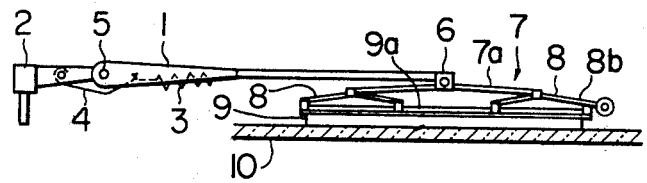
FIG. 1 is a schematic view of a windshield wiper in explanation of the construction in which the invention is incorporated.

The device according to the invention for preventing the vibration of a windshield wiper will now be described by referring to the embodiments shown in the drawings. Referring to FIG. 1, the windshield wiper comprises a wiper arm 1 supported through a pin 5 by a pivot arm 2 secured to a suitable fixed part of a vehicle body and moved in swinging movement by a wiper motor through a linkage, both not shown, so that the windshield wiper as a whole moves in sliding movement. The wiper arm 1 can be moved toward and away from a windshield surface 10 through the pin 5 and supports at its forward end a wiper blade 7 comprising a main support member 7a, an auxiliary support member 8, a resilient blade member 9 and a backing plate 9a. The wiper blade 7 is rotatably supported by a grip 6 at the forward end of the wiper arm 1 and forced against the windshield surface 10 by the biasing force of a spring 3 mounted between the wiper arm 1 and pivot shaft 2 at the resilient blade member 9.

Figure 2:
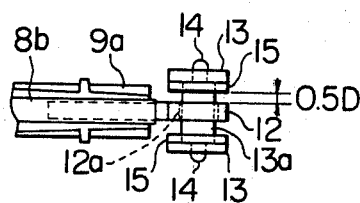
FIG. 2 is a plan view of a first embodiment of the invention.
Figure 3:
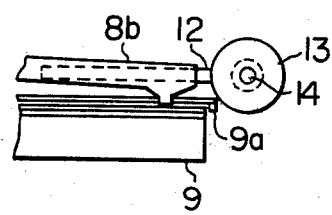
FIG. 3 is a side view of the first embodiment shown in FIG. 2.

A weight 13 is mounted according to the invention at the forward end of an outer periphery 8b of the auxiliary support member 8 for sliding movement and has a shock absorbing member suitably attached thereto for avoiding the vibration of the wiper blade. FIGS. 2 and 3 show a first embodiment in which a holder 12 secured to the inner surface of the outer periphery 8b of the auxiliary support member 8 has formed at its forward end an opening 12a through which a pin 13a extends. The weight 13 is supported on the pin 13a and has one of its opposite ends disposed on either side of the holder 12 and secured to an end 14 of the pin 13a as by caulking in such a manner that there is a distance 0.5 D between either end of the weight 13 and the holder 12. The weight 13 is formed of brass containing lead, steel, etc., and has a shock absorbing member 15 attached to either end thereof. In the embodiment shown, actuation of the wiper arm 1 causes the wiper blade 7 to vibrate due to stick slip caused by variations in the force of friction acting between the resilient blade member 9 and the windshield surface 10. However, since there is a distance D for sliding movement, the weight 13 remains stationary at the initial stages of vibration, and the holder 12 is brought into abutting engagement with one end of the weight 13 through the shock absorbing member 15 when the holder 12 has moved the distance 0.5 D. At this time, the force of inertia of the weight 13 acts on the holder 12 as a force oriented in a direction opposite to the direction of movement of the holder 12, and the holder 12 is caused to lose energy by collision thereof against the weight 13 and the sliding movement thereof lasting until the collision occurs, thereby causing the holder 12 to stop vibrating. In the embodiment shown and described herein above, the combined weight of the weight 13 and the pin 13a is in the range between 10 and 50 gr., preferably in the range between 15 and 35 gr., to enable satisfactory results to be achieved. The distance D for sliding movement is in the range between 1 and 10 mm., preferably in the range between 3 and 6 mm., to enable satisfactory results to be achieved. The weight 13 and the pin 13a can achieve best results when mounted at the forward end of the outer periphery 8b of the auxiliary support member 8 of the wiper blade 7. However, it is to be understood that the invention is not limited to this specific position in which the weight means 13 and 13a is mounted, and that the weight means may be mounted in any other suitable position. It has been ascertained that the desired results can be achieved when the weight means is mounted near the center of the wiper blade 7 or at the lower end thereof.

Figure 4:
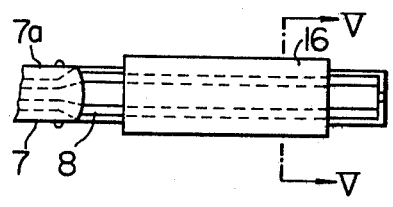
FIG. 4 is a plan view of a second embodiment.
Figure 5:
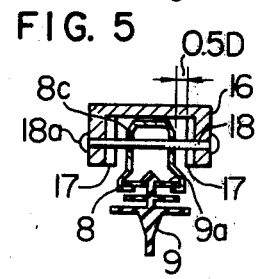
FIG. 5 is a sectional view taken along the line V—V in FIG. 4.

FIGS. 4 and 5 show a second embodiment in which the auxiliary support member 8 is formed with an opening 8c through which a pin 18 is inserted. The pin 18 also extends through a channel-shaped weight 16 having a shock absorbing member 17 attached to either side thereof and caulked at either end as indicated at 18a thereby secure the weight 16 to the pin 18. In this embodiment, there is a distance 0.5 D between the shock absorbing member 17 on either side of the weight 16 and either inner surface of the auxiliary support member 8 serving as a holder as shown in FIG. 5 for the auxiliary support member 8 acting as a holder to move in sliding movement toward and away from the weight 16. The mechanism for causing the vibration of the holder is the same as described by referring to the embodiment shown in FIGS. 2 and 3. This embodiment offers the additional advantage that the part extending outwardly from the wiper blade 7 is small in size, so that the field of vision of the driver forwardly of the vehicle is not interferred with the mounting of the wiper.

Figure 6:
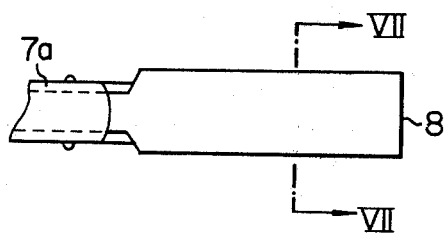
FIG. 6 is a plan view of a third embodiment.
Figure 7:
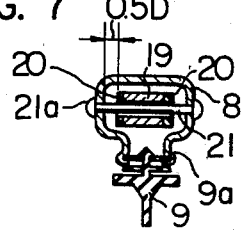
FIG. 7 is a sectional view taken along the line VII—VII in FIG. 6.

A third embodiment is shown in FIGS. 6 and 7 in which the auxiliary support member 8 serving as a holder as a pin 21 extending therethrough and secured at opposite ends thereof to opposite sides of the auxiliary support member 8 as by caulking as indicated at 21a for supporting a weight 19 for sliding movement. The weight 19 has a shock absorbing member 20 attached to either end thereof, so that there is a distance 0.5 D between one inner side of the auxiliary support member 8 and the shock absorbing member 20 at one end of the weight 19 for the holder (auxiliary support member 8) to move in sliding movement. This embodiment also permits the mounted without interferring with the field of vision of the driver forwardly of the vehicle.

Figure 8:
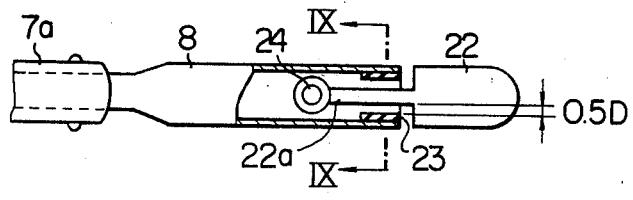
FIG. 8 is a plan view of a fourth embodiment.
Figure 9:
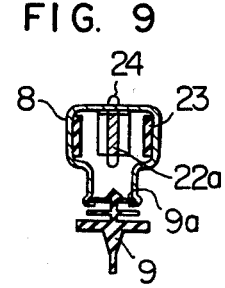
FIG. 9 is a sectional view taken along the line IX—IX in FIG. 8.

FIGS. 8 and 9 show a fourth embodiment in which a shock absorbing member 23 is mounted on either inner surface of the forward end of the auxiliary support member 8 serving as a holder, and a pin 24 pivotally supporting a stem 22a of a weight 22 of the shape shown in FIG. 8 is secured to the auxiliary support member 8 as by caulking. In this embodiment, the weight 22 is movable a distance of 0.5 D both upwardly and downwardly in FIG. 8, and the operation of and the results achieved by the windshield wiper are similar to those of the first embodiment shown in FIGS. 2 and 3.

From the foregoing description, it will be appreciated that the device for preventing the vibration of the windshield wiper according to the invention enables the end of avoiding the vibration of the wiper blade to be attained by a simple construction in which slidable weight means is mounted in the windshield wiper. The device does not interfere with the field of vision of the driver forwardly of the vehicle, and does not increase the load of the wiper motor and the cost of production.

What is claimed is:

1. A device for preventing the vibration of a windshield wiper comprising a wiper blade including a resilient member formed as of rubber for wiping the surface of a windshield connected to the forward end of a wiper arm driven by a wiper motor and moved in swinging movement through a linkage, such device comprising:
   weight means mounted at one end of a holder and comprising a weight having two ends each secured to one of opposite ends of a pin extending through the holder and separated from each other a suitable distance for the holder and the weight to move relative to each other between the two ends of the pin.

2. A device as claimed in claim 1, further comprising a shock absorbing member mounted on the weight or the holder so that the holder is brought into abutting engagement with the weight through the shock absorbing member.

3. A device as claimed in claim 1 or 2, wherein the distance for the holder to move in sliding movement is in the range between 1 and 10 mm.

4. A device as claimed in claim 3, wherein the weight means has a weight in the range between 10 and 50 gr.

5. A device for preventing the vibration of a wiper blade of a windshield wiper comprising:
   weight means comprising a pin and a weight, said pin extending through an opening formed at the forward end of a holder secured to the inner side of the forward end portion of the outer periphery of the wiper blade, and said weight having two ends each secured to one of opposite ends of said pin and separated from each other a suitable distance for the holder to move in sliding movement between the two ends of the weight and abut against the weight through a shock absorbing member.

6. A device as claimed in claim 5, wherein said weight means is mounted in the central portion of a main support member of the wiper blade.

7. A device for preventing the vibration of a windshield wiper comprising:
   a pin inserted in an opening formed in an auxiliary support member of a wiper blade; and
   a weight of the channel shape having a shock absorbing member attached to either inner surface of said weight, said weight having said pin extending therethrough and secured thereto at opposite ends, so that the weight can move in sliding movement along the pin.

8. A device for preventing the vibration of a windshield wiper comprising:
   a pin extending through an auxiliary support member of a wiper blade and secured at opposite ends thereto; and
   a weight slidably supported on said pin within said auxiliary support member, said weight having a shock absorbing member attached to either side thereof.

9. A device for preventing the vibration of wiper blade comprising:
   a pin connected to an auxiliary support member of a wiper blade, said auxiliary support member having a shock absorbing member attached to an inner surface of the forward end portion thereof; and
   a weight having a stem pivotally supported by said pin so that said weight is brought into abutting engagement with said auxiliary support member through said shock absorbing member.

10. A device as claimed in any one of claims 5-8, wherein said weight has a weight in the range between 10 and 50 gr., and the distance of sliding movement is in the range between 1 and 10 mm.

11. A device as claimed in claim 9, wherein said weight has a weight in the range between 10 and 50 gr., and the distance of pivotal movement between said stem and said shock absorbing member is in the range between 1 and 10 mm.

* * * * *